US011144899B2

(12) United States Patent
DeBardlebon et al.

(10) Patent No.: US 11,144,899 B2
(45) Date of Patent: Oct. 12, 2021

(54) TERMINAL ACCESS AND LOAD MANAGEMENT

(71) Applicant: NCR Corporation, Atlanta, GA (US)

(72) Inventors: Zachary Christopher DeBardlebon, Atlanta, GA (US); James Emery Fugedy, II, Marietta, GA (US); Aleah Jean Kadry, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/777,080

(22) Filed: Jan. 30, 2020

(65) Prior Publication Data
US 2021/0241249 A1    Aug. 5, 2021

(51) Int. Cl.
*G06K 5/00* (2006.01)
*G06Q 20/20* (2012.01)
*G06N 20/00* (2019.01)
*G06Q 10/04* (2012.01)
*G06K 9/00* (2006.01)

(52) U.S. Cl.
CPC ....... *G06Q 20/202* (2013.01); *G06K 9/00771* (2013.01); *G06N 20/00* (2019.01); *G06Q 10/04* (2013.01)

(58) Field of Classification Search
CPC .... G06Q 20/12; G06Q 20/20; G06Q 30/0201; H04W 4/029; H04W 4/02
USPC ............... 235/383, 380, 385, 462.46, 472.02
See application file for complete search history.

(56) References Cited

U.S. PATENT DOCUMENTS

| | | | | |
|---|---|---|---|---|
| 5,097,328 A | * | 3/1992 | Boyette | G06Q 10/06 348/150 |
| 6,195,121 B1 | * | 2/2001 | Huang | G06K 9/00228 348/144 |
| 8,317,101 B2 | * | 11/2012 | Herwig | G07G 1/0054 235/439 |
| 9,892,438 B1 | * | 2/2018 | Kundu | G06Q 30/0609 |
| 2007/0253595 A1 | * | 11/2007 | Sorensen | G07C 9/00 382/103 |
| 2009/0249342 A1 | * | 10/2009 | Johnson | G06Q 10/04 718/101 |
| 2016/0224845 A1 | * | 8/2016 | Gyger | G06T 7/20 |
| 2018/0046943 A1 | * | 2/2018 | Gauthier | G06Q 10/02 |
| 2020/0226523 A1 | * | 7/2020 | Xu | G06K 9/00369 |
| 2020/0327561 A1 | * | 10/2020 | Klima | G07C 11/00 |

* cited by examiner

*Primary Examiner* — Daniel St. Cyr
(74) *Attorney, Agent, or Firm* — Schwegman, Lundberg & Woessner

(57) ABSTRACT

Cameras capture time-stamped images of customers, carts, and items possessed by the customers. Customer queues at checkout stations/transaction terminals are monitored for queue lengths, opened terminals, closed terminals, and a total number of items possessed by each customer within each queue. Queue wait times are calculated for each queue and the queue wait times are displayed on monitors adjacent to the queues. Customers approaching the checkout stations are directed to specific queues based on the queue wait times. Closed terminals are opened in advance of a time when a shortest expected wait time for the queues is expected to exceed a threshold wait time. In an embodiment, each queue length is managed based on staff performance metrics associated with staff operating the terminals.

19 Claims, 4 Drawing Sheets ated devices 150.

TERMINAL ACCESS AND LOAD MANAGEMENT

BACKGROUND

Checkout lines are slow and often get backed up. It seems that not enough checkout lanes are open at optimal times when needed to handle rush hour customer traffic. Furthermore, when help is requested, a busy store attendant must pause their checkout lane to call for assistance. On-site employees must then finish their current tasks and come from throughout the store to open a checkout lane. By the time a new lane is opened, its often too late and checkout lanes have unreasonable customer wait times. Customers are left dissatisfied with their slow and stressful checkout experience, and on-site employees are often left underutilized.

Such situations can have detrimental impacts on the stores, some customers may put their items down and leave the store without waiting in any of the available checkout lanes. Some of the customers that leave may not return to the store or may avoid the store altogether during peak times of day or peak calendar days where crowds are expected to be present.

Moreover, the staff productivity is impacted because employees are underutilized at times when their productivity is expected to be and should be high. Review of transaction data may lead the store to believe that additional staff is needed during anticipated peak times of day or peak calendar days, when such may not be the case because adequate staff was available onsite but was that staff was imprudently assigned tasks that were of less import. As a result, the store may find that having additional staff still does not adequately reduce checkout times during the peak periods.

As a result, there is a need for improved checkout lane availability, traffic load assignment, and scheduling.

SUMMARY

In various embodiments, methods and a system for terminal access and load management are presented.

According to an embodiment, a method for terminal access and load management is presented. A total number of individuals in each of a plurality of queues associated with checkout terminals is determined from video frames. A total number of items possessed by each individual is identified based on the video frames. A total wait time for checkout at each queue is calculated based on the total number of individuals in each queue and the total number of items possessed by each individual. The total wait times for the queues are displayed on at least one monitor.

DETAILED DESCRIPTION

Figure 1:
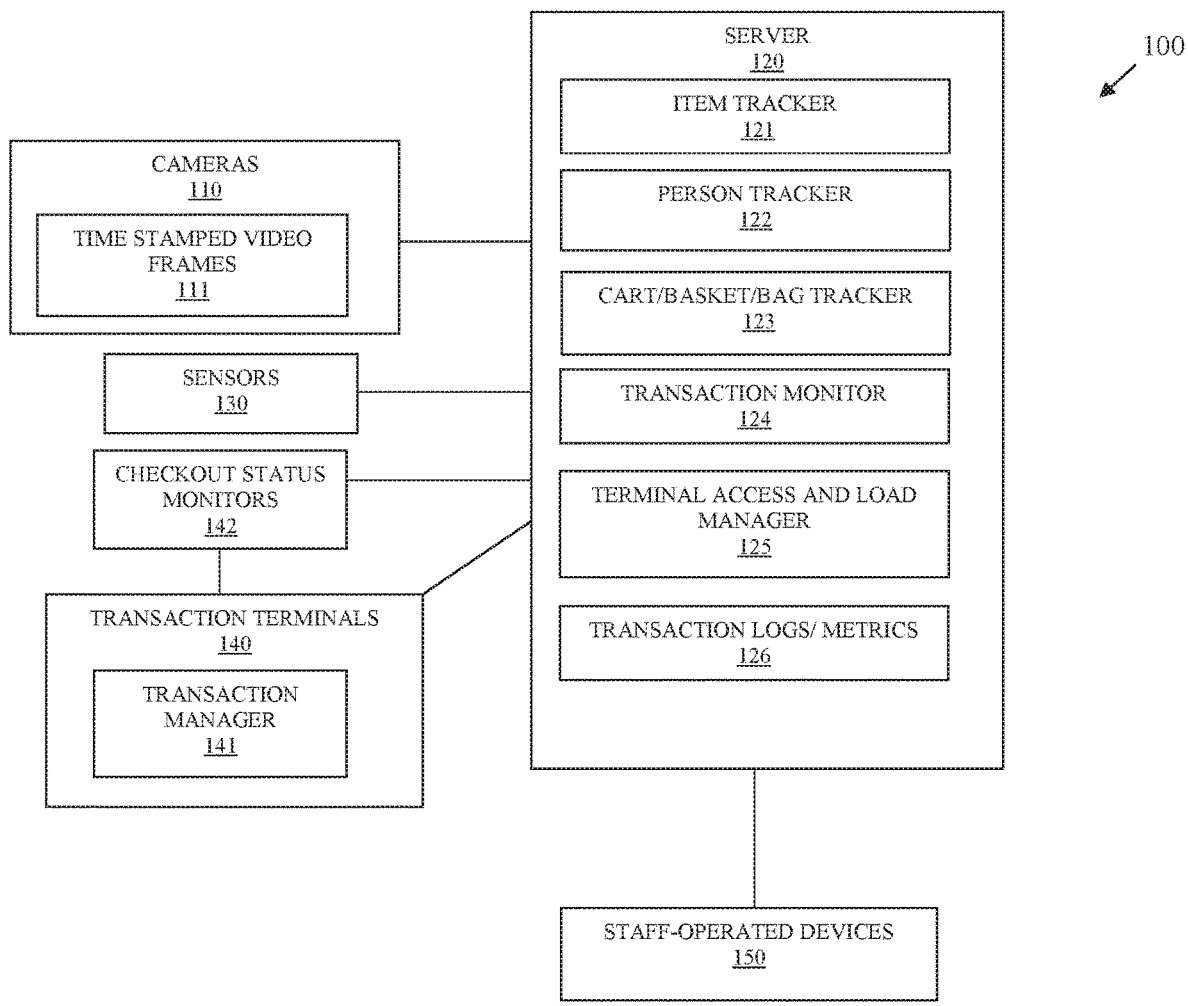
FIG. 1 is a diagram of a system for terminal access and load management, according to an example embodiment.

FIG. 1 is a diagram of a system 100 for terminal access and load management, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of terminal access and load management, presented herein and below.

The terms "customer" and/or "consumer" may be used interchangeably and synonymously.

As will be demonstrated herein and below, system 100 utilizes computer vision to monitor and track checkout lanes for checkout stations/terminals and item counts possessed by customers (who are located in queues or headed towards queues) for checkout processing. Transaction metrics for operators of the terminals are processed as are total customers-per queue, total available and unopened terminals, and historical customer traffic patterns. Wait times for accessing the terminals are predicted and displayed in each checkout lane or on a common digital sign. Decisions are made as to whether terminals should be opened or closed, and staffing is dynamically dispatched to terminals being opened. System 100 also ensures that a predefined wait time is not exceeded for any customer awaiting checkout.

The system 100 includes a plurality of cameras 110 that capture time-stamped video frames 111 (hereinafter: "video 111," "frames 111," "images 111," "image frames 111," and/or "video frames 111"). The system 100 also includes one or more types of sensors 130, transaction terminals 140, checkout status monitors/digital signs 142, and staff-operated devices 150.

The server 120 includes executable instructions that execute on one or more hardware processors of the server 120 from a non-transitory computer-readable storage medium as: an item tracker 121, a person tracker 122, a cart/basket/bag tracker 123, a transaction monitor 124, and terminal-access-and-load manager 125. Furthermore, server 120 may include a variety of data stores, databases, or files one or more of which comprise transaction logs/metrics 126.

Transaction terminals 140 include executable instructions that execute on one or more hardware processors of terminals 140 as transaction manager 141. Transaction terminals 140 may be operated by staff as Point-Of-Sale (POS) terminals and/or operated by customers during self-checkouts as Self-Service Terminals (SSTs).

Checkout status monitors 142 may be directly interfaced as a peripheral display to a particular terminal 140 or may be interfaced to server 120. In an embodiment, a checkout status monitor 142 may be managed for two or more terminals 140.

Sensors 130 can include Radio Frequency (RF) or wireless tag readers that read wireless tags placed on items and/or read wireless tags associated with carts, baskets, and/or bags in possession of customers. In an embodiment, sensors 130 are optional to system 100.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-125 may execute on or be accessible from a same server 120 or multiple different servers networked together in a cloud processing environment (cloud).

When a customer enters a store or is outside the store in the parking lot, cameras 110 begin capturing the time-stamped vide frames 111.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the cart/basket/bag tracker 123. In an embodiment, some of the images when streamed from the cameras 110 can be buffered or cached in memory of cache and made accessible from the memory or cache to the item tracker 121, the person tracker 122, and cart/basket/bag tracker 123.

Each accessible image/video frame 111 includes its metadata (minimally including what was discussed above) with its image 111 on the server 120.

The person tracker 122 processes the pixels of the images to identify a unique person (the actual identity of the person can be unknown, but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eyeglasses (sunglasses), hats, eye color, etc. A bounding box is placed around the unique person (within each image 111) and associated with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images. The identity, if obtained, is associated with a known customer identifier associated with a customer account of the store.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) may be unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame 111, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

Cart/basket/bag tracker 123 monitors frames 111 for carts, baskets, or bags. Each identifiers cart, basket, and/or bag assigned a cart, basket, or bag identifier.

Item tracker 121, person tracker 122, and cart/basket/bag tracker report identifiers for frames 111, identifiers for persons within a given frame 111, identifiers of items within a given frame 111 and associated with a given person, and identifiers for carts, baskets, and/or bags associated with given items of a given frame 111 to terminal-access-and-load manager 125.

Terminal-access-and-load manager 125 maintains a total count of unique persons/customers within the store from the reported person identifiers from person tracker 122 at any given point in time, maintains a total item count for items associated with each person as reported from item tracker 121, and maintains assignments of specific items to specific carts, baskets, or bags as reported by cart/basket/bag tracker 123. The frames 111 associated with the person tracker 122 also are linked via the metadata to specific locations within the store, which is processed by terminal-access-and-load manager 125 to obtain a current store location for each unique person/customer. Known locations for checkout stations associated with terminals 140 are utilized along with the current location of each unique person.

Terminal-access-and-load manager 125 also maintains total person counts associated with each checkout station based on known locations (including those locations associated with a queue at a given checkout station) for each checkout station and current locations reported for the person identifiers. So, at any given point in time, terminal-access-and-load manager 125 can calculate and obtain, a current store location for each person within the store, a total number of persons/customers present within the store, a total number of items possessed by each person, a presumed location of each item within a cart, basket or bag of a given person, and a total number of persons in each checkout station queue associated with a given terminal 140.

Transaction monitor 124 monitors transaction data and staff data in real time. Transaction monitor 124 determines which terminals 140 are actively processing transactions based on transaction information being produced from transaction managers 141; determines staff member identities for each staff member operating a given terminal 140 (based on transaction terminal identifiers and logged in identifiers for each staff member); determines transaction terminal identifiers that are not producing any transaction data and are offline (not open for checkouts) based on known transaction terminal identifiers for all terminals 141 and based the terminals 140 actively producing transaction data through their transaction managers 141.

Transaction monitor 124 also accesses operational and scheduling data of the store, to identify the staff member identities for staff members that are currently present at the store and are working. Each staff member identity may be linked to a staff-operated device identifier associated with a staff-operated device 150 (mobile device, tablet, wearable processing device, etc.).

Still further, transaction monitor 124 maintains current average transaction performance rates for each staff member identity based on transaction logs/metrics 126 associated with previous transactions processed by that staff member. For example, transaction monitor 124 may calculate and maintain: the average elapsed time required by a given staff member to process a single item at a terminal 140 during a checkout (item transaction rate), the average elapsed time required to obtain payment and complete a transaction by a given staff member (average payment and completion rate), the average rate of transaction time per transaction by a given staff member (average transaction rate). The performance rates may show some staff members process smaller item-count transactions better than other staff members that processing larger item-count transaction better, and/or other object performance relationships. The transaction logs/metrics may also show a high number of required transaction interventions by specific staff members (average number of interventions per transaction), a high number of voids (average number of voids per transaction), and other performance data metrics that impact both the speed and quality (interventions and/or voids). As staff members perform transaction checkouts, transaction monitor 124 updates current performance metrics for those staff members based on transaction metrics recorded in transaction logs/metrics 126.

Terminal-access-and-load manager 125 utilizes the total number of customers per queue at a checkout station associated with a given terminal 140, the staff member identity associated with the staff member operating the terminal, the number of items per customer in the queue, and the performance rates associated with the staff member to calculate a length of elapsed time predicted before a customer entering an end of a queue for a given terminal 140 (checkout station) will be serviced/checked out by the staff member operating that terminal 140. This is maintained as a current terminal wait time, checkout wait time, or terminal access time. Terminal-access-and-load manager 125 maintains the current terminal wait time for each terminal 140 (checkout station) and continually computers in real time the current terminal wait times based on changing conditions detected from the information being reported by trackers 121-123 and monitor 124.

Terminal-access-and-load manager 125 also compares each current terminal wait time against a minimum allowed wait time threshold value, which can be provided as a processing parameter to terminal-access-and-load manager 125. This threshold wait time is utilized by terminal-access-and-load manager 125 with: the current terminal wait times for each terminal 140; total number of customers in each queue; total number of items per customer; available staff working at the store; opened terminals 140; closed terminals 140; and performance metrics calculated for available staff and staff currently operating opened terminals 140 to direct customers entering queues for the terminals 141 to queues associated with terminals 141 with the shortest wait times and to send notifications to staff members not currently operating a terminal 140 to open a closed terminal 140 for processing customer checkouts.

Terminal-access-and-load manager 125 optimizes the wait times and queue lengths by opening available but closed terminals 140, directing customers to specific queues and managing each queue's queue length based on the threshold wait time, and/or directing specific staff members associated with good performance rates to open the closed terminals 140.

In some cases, based on available and open terminals 140 and queue lengths, terminal-access-and-load manager 125 may instruct a specific staff member (cashier) to shut down a given terminal 140 via notification to a staff operated device 150 of that staff member or via a message sent to a display of the terminal 140 being operated by that staff member.

In this way, terminal-access-and-load manager 125 manages busy periods for checkouts as well as periods that are not busy.

Terminal-access-and-load manager 125 provides real-time notifications to the customers via displayed information presented on monitors 142. The displayed information may include: terminal identifiers (checkout lane numbers), current wait times for that terminal 140, and a shortest queue wait time for a specific terminal 140 where the customer can be checkout the soonest based on the states of each terminal's queue and the staff member operating each terminal 140.

In an embodiment, terminal-access-and-load manager 125 includes a trained-machine learning algorithm that is trained on: the transaction logs/metrics for the staff members, the threshold wait time, the total customers per store, total customers per queue, total items per customer, available staff, opened terminals 140, staff and open terminal assignments, and closed terminals 140. The output of the trained-machine learning algorithm is an expected wait time for each queue, an optimal number of terminals 140 to have opened, an optimal staff and terminal assignments 140.

One now appreciates how wait times at queues of terminals 140 (checkout stations/lanes) can be calculated in real time and displayed to customer entering queues on monitors 142 along with suggested queue placement for customers to achieve quickest checkouts. In addition, customer traffic at the store (including those not yet in queues) and current queue lengths at the terminal can be used for calculating how many terminals 140 should be opened even before the queue wait times exceed the threshold wait time. This allows the staff time to travel from their current locations within the store to the closed terminal 140 and open that terminal 140 before the current queue lengths are believed to reach a point in which the threshold wait time is unachievable. Moreover, and counterintuitively, some queue lengths can be noticeably longer than other queues based on the total number of items held by the customers in each of the queues and based on performance metrics of the staff members (cashiers) operating the terminals 140.

In an embodiment, terminal-access-and-load manager 125 utilizes a trained machine-learning algorithm to receive video of a cart and produce as output a total item count for the cart. In such an embodiment, the item tracker 121 may be replaced by the trained machine-learning algorithm.

In an embodiment, terminal-access-and-load manager 125 utilizes sensors 130 to read wireless item or wireless car, basket, or bag tags as a customer with or within a cart, a basket, or a bag walks towards a queue and obtains an item count for that customer. This may also be used to identify the cart, basket, or bag when present. In such an embodiment, the item tracker 121 and the cart/basket/bag tracker 123 may be unneeded.

In an embodiment, terminal-access-and-load manager 125 manages both cashier or staff operated terminals 140 (POS terminals) and SSTs operated by customers during self-checkouts. In the case of the SSTs, the performance metrics associated with specific staff is replaced by performance metrics associated with an average customer that operates the SST when determining wait times and queue suggestions to the customers of the SSTs on the monitors 142. In this embodiment, a monitor 142 associated with the SSTs may also display wait times at cashier-assisted terminals, such that the customers can decide whether to wait on an SST or whether to move over to a POS terminal for checkouts. Similarly, a monitor 142 associated with the POS terminals may display wait times at SSTs, such that customers can decide whether to wait on a POS terminal or whether to move over to an SST for self-checkout.

In an embodiment, terminal-access-and-load manager 125 utilizes staff performance metrics to reassign staff at one terminal 140 to another terminal 140, such that the more efficient staff member operates longer queues than a less efficient staff member.

These embodiments and other embodiments are now discussed with reference to the FIGS. 2-4.

Figure 2:
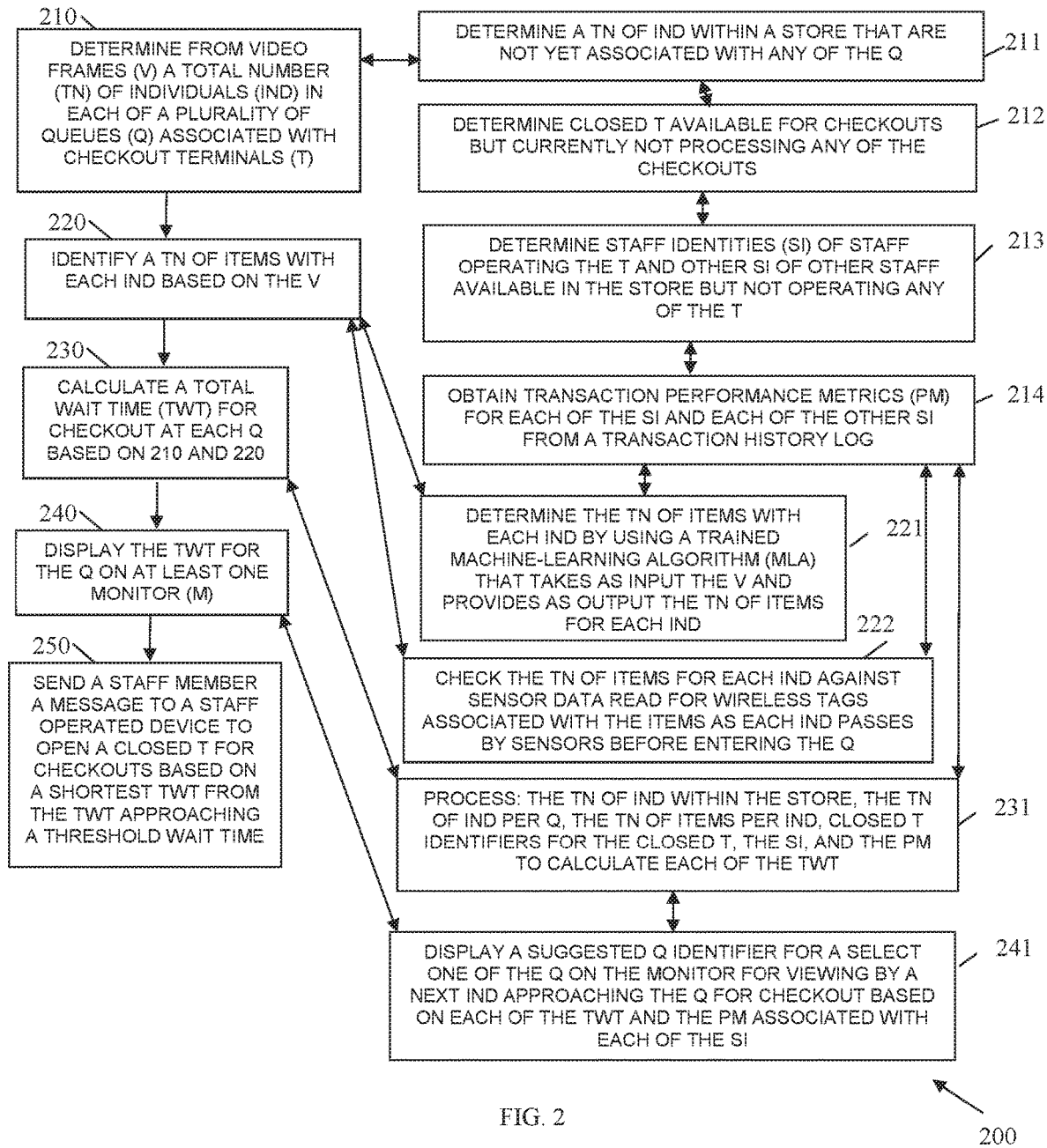
FIG. 2 is a diagram of a method for terminal access and load management, according to an example embodiment.

FIG. 2 is a diagram of a method 200 for terminal access and load management, according to an example embodiment. The software module(s) that implements the method 200 is referred to as a "terminal checkout station queue manager." The terminal checkout station queue manager is implemented as executable instructions programmed and residing within memory and/or a non-transitory computer-readable (processor-readable) storage medium and executed by one or more processors of a device. The processor(s) of the device that executes the terminal checkout station queue manager are specifically configured and programmed to process the terminal checkout station queue manager. The terminal checkout station queue manager has access to one or more network connections during its processing. The network connections can be wired, wireless, or a combination of wired and wireless.

In an embodiment, the device that executes the terminal checkout station queue manager is the server 120. In an embodiment, the server 120 is a cloud-based server (cloud).

In an embodiment, the terminal checkout station queue manager is all or some combination of: 121-125.

At 210, the terminal checkout station queue manager determine from video frames a total number of individuals in each of a plurality of queues associated with checkout terminals.

In an embodiment, at 211, the terminal checkout station queue manager determines a total number of individuals within a store that are not yet associated with any of the queues.

In an embodiment of 211 and at 212, the terminal checkout station queue manager determines closed transaction terminals that are available for checkouts but are not currently processing any of the checkouts.

In an embodiment of 212 and at 213, the terminal checkout station queue manager determines staff identities for staff operating the checkout terminals and other staff identities for other staff available within the store but not operating any of the checkout terminals.

In an embodiment of 213 and at 214, the terminal checkout station queue manager obtains transaction performance metrics for each of the staff identities and each of the other staff identities from a transaction history log or database.

At 220, the terminal checkout station queue manager identifies a total number of items possessed by each individual based on the video frames.

In an embodiment of 214 and 220, at 221, the terminal checkout station queue manager determines the total number of items with each individual by using a trained machine-learning algorithm that takes as input the video and provides as output the total number of items for each individual.

In an embodiment of 214 and 220, at 221, the terminal checkout station queue manager checks the total number of items for each individual against sensor data read for wireless tags associated with the items as each individual passes by sensors before entering the queues.

At 230, the terminal checkout station queue manager calculates a total wait time for checkout at each queue based on 210 and 220.

In an embodiment of 214 and 220, at 231, the terminal checkout station queue manager processes the total number of individual within the store, the total number of individuals per queue, the total number of items per individual, closed terminal identifiers for the closed terminals, the staff identities, and the transaction performance metrics to calculate each of the transaction wait times for each of the queues.

At 240, the terminal checkout station queue manager displays the transaction wait times on at least one monitor adjacent to the queues.

In an embodiment of 231 and 240, at 241, the terminal checkout station queue manager displays a suggested queue identifier for a select one of the queues on the monitor for viewing by a next individual who is approaching the queues for checkout based on each of the transaction wait times and the performance metrics associated with each staff identity.

According to an embodiment, at 250, the terminal checkout station queue manager sends a staff member a message to a staff operated device to open a closed checkout terminal for checkouts based on a shortest transaction wait time approaching a threshold wait time.

Figure 3:
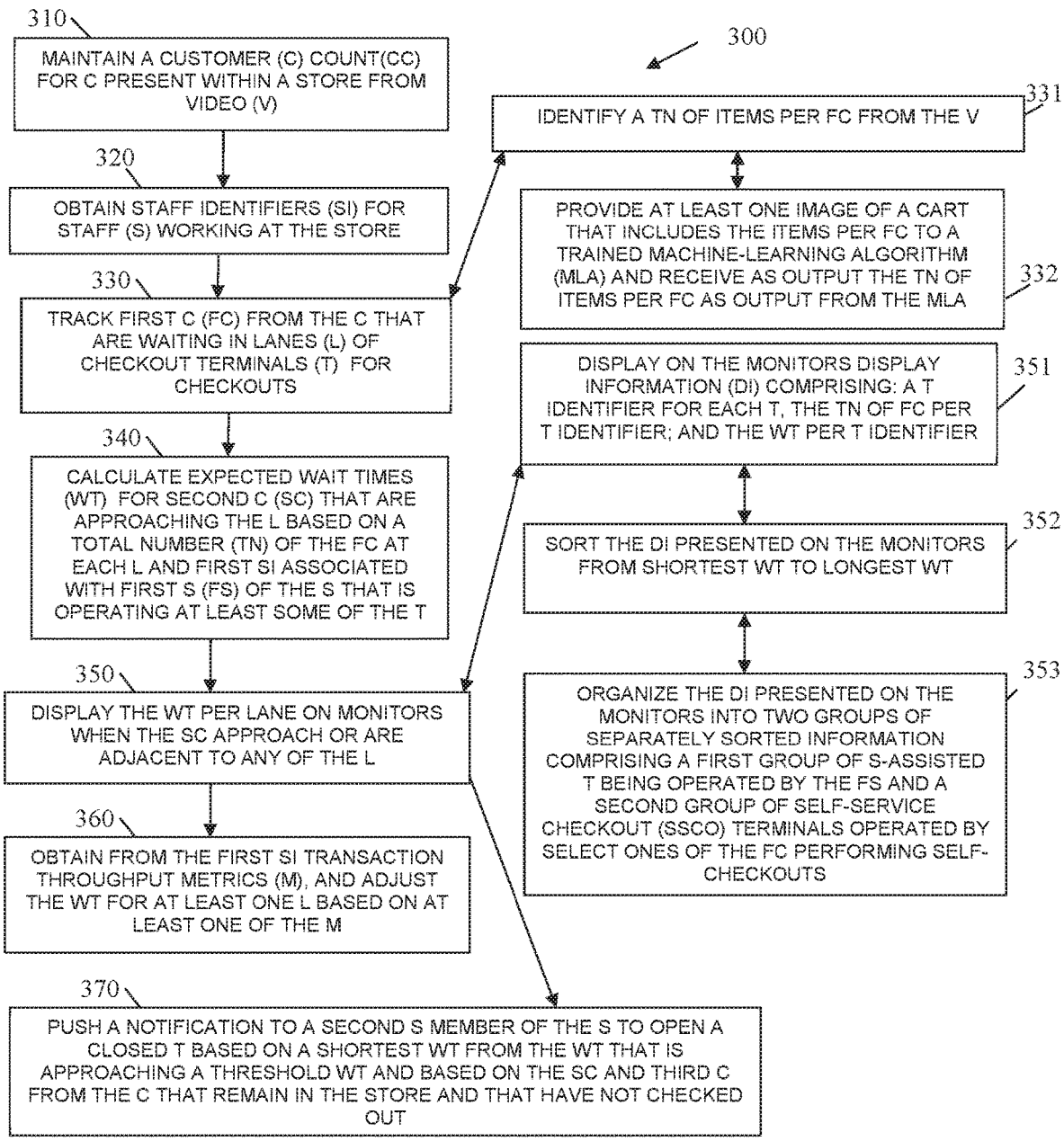
FIG. 3 is a diagram of another method for terminal access and load management, according to an example embodiment.

FIG. 3 is a diagram of another method 300 for terminal access and load management, according to an example embodiment. The software module(s) that implements the method 300 is referred to as a "checkout optimizer." The checkout optimizer is implemented as executable instructions programmed and residing within memory and/or a non-transitory computer-readable (processor-readable) storage medium and executed by one or more processors of a device. The processors that execute the checkout optimizer are specifically configured and programmed to process the checkout optimizer. The checkout optimizer has access to one or more network connections during its processing. The network connections can be wired, wireless, or a combination of wired and wireless.

In an embodiment, the device that executes the checkout optimizer is the server 120. In an embodiment, the server 120 is a cloud processing environment (cloud).

In an embodiment, the checkout optimizer is all of or some combination of: 121-125 and/or the method 200.

The checkout optimizer presents another and, in some ways, enhanced processing perspective of the method 200 discussed above.

At 310, the checkout optimizer maintains a customer count for customers present within a store from video.

At 320, the checkout optimizer obtains staff identifiers for staff working at the store.

At 330, the checkout optimizer tracks first customers from the customers that are waiting in lanes of checkout terminals for checkouts.

In an embodiment, at 331, the checkout optimizer identifies a total number of items per customer from the video.

In an embodiment of 331 and at 332, the checkout optimizer provides at least one image of a cart that includes the items per first customer to a trained machine-learning algorithm and receives as output the total number of items per first customer from the trained machine-learning algorithm.

At 340, the checkout optimizer calculates expected wait times for second customers that are approaching the lanes based on a total number of the first customers at each lane and first staff identifiers associated with first staff of the staff that is operating at least some of the checkout terminals.

At 350, the checkout optimizer displays the expected wait times on monitors when the second customers approach or are adjacent to any of the lanes.

In an embodiment, at 351, the checkout optimizer displays on the monitors display information comprising: a checkout terminal identifier for each checkout terminal, the total number of first customers per checkout terminal identifier, and the expected wait time per checkout terminal identifier.

In an embodiment of 351 and at 352, the checkout optimizer sorts the display information presented on the monitors from shortest expected wait times to longest expected wait times.

In an embodiment of 352 and at 353, the checkout optimizer organizes the display information presented on the monitors into two groups of separately sorted information comprising: a first group of staff-assisted terminals being operated by the first staff and a second group of Self-Service Checkout (SSCO) terminals operated by select ones of the first customers performing self-checkouts.

In an embodiment, at 360, the checkout optimizer obtains from the first staff identifiers transaction throughput metrics and the checkout optimizer adjusts the expected wait times for at least one of the lanes based on at least one of the transaction throughput metrics. Here, the queue length for the lanes may be longer in a lane associated with an efficient staff member in processing checkouts/transactions. The expected wait times are driven by performance of the staff operating the checkout terminals, the length of the queues in the lanes, and the total number of items possessed by each customer in each lane.

In an embodiment, at 370, the checkout optimizer pushes a notification to a second staff member of the staff to open a closed checkout terminal based on a shortest expected wait time selected from the expected wait times that is approaching a threshold wait time based on the second customers and third customers from the customers that remain in the store and have not checked out yet. This is done in advance of a need to prevent any expected wait time from reaching the threshold expected wait time.

Figure 4:
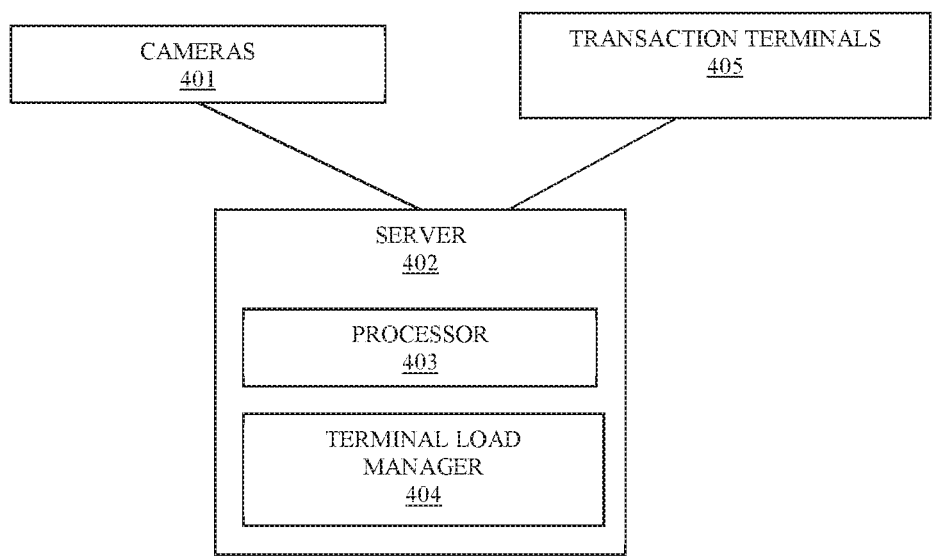
FIG. 4 is a diagram of another system for terminal access and load management, according to an example embodiment.

FIG. 4 is a diagram of another system 400 for terminal access and load management, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

The system 400 includes a plurality of cameras 401, a server 402, and a plurality of transaction terminals 405. The server 402 includes at least one hardware processor 403 and configured to execute executable instructions from a non-transitory computer-readable storage medium as terminal load manager 404.

The terminal load manager 404 when executed from the non-transitory computer-readable storage medium on the processor 403 is configured to perform processing comprising: 1) tracking a total number of customers in a queue for the checkouts per transaction terminal 405 from images captured by the cameras 401; 2) tracking a total number of items possessed by each customer from the images; 3) obtaining transaction performance metrics for operators of each of the transaction terminals 405; 4) predicting an expected wait time for entering each of the queues based on the total number of the customers per queue, the total number of items per customer, and the transaction performance metrics per operator; 5) sending a notification to a second operator that instructs the second operator to open a closed transaction terminal 405 for assisting in the checkouts based on a shortest expected wait time selected from the expected wait times approaching a threshold wait time; and 6) displaying on monitors adjacent to the transaction terminals the expected wait time for each of the transaction terminals.

In an embodiment, the terminal load manager 404 is all or some combination of: 121-125, the method 200, and/or the method 300.

In an embodiment, the transaction terminals comprise POS terminals and SSTs.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining transaction performance metrics for staff members operating checkout terminals;
determining from video frames a total number of individuals in each of a plurality of queues associated with the checkout terminals;
identifying a total number of items with each individual based on the video frames;
calculating a total wait time for checkout at each queue based on the determining and the identifying and further based on the transaction performance metrics of each staff member and the corresponding checkout terminal being operated by the corresponding staff member;
displaying the total wait times for the queues on at least one monitor;
maintaining current transaction performance metrics for the staff members as checkouts are processed at the checkout terminals; and
updating the transaction performance metrics for the staff members with the current transaction performance metrics.

2. The method of claim 1, wherein determining further includes determining a total number of individuals within a store that are not yet associated with any of the queues.

3. The method of claim 2, wherein determining further includes determining closed checkout terminals available for checkouts but currently not processing any of the checkouts.

4. The method of claim 3, wherein determining further includes determining staff identities of the staff members operating the checkout terminals and other staff identifies of other staff members that are available in the store but are not currently operating any of the checkout terminals.

5. The method of claim 4, wherein obtaining further includes obtaining the transaction performance metrics for each of the staff identities and each of the other staff identities from a transaction history log.

6. The method of claim 5, wherein identifying further includes determining the total number of items with each individual by using a trained machine-learning algorithm that takes as input the video frames and provides as output the total number of items for each individual.

7. The method of claim 5, wherein identifying further includes checking the total number of items for each individual against sensor data read for wireless tags associated with the items as each individual passes by sensors before entering the queues.

8. The method of claim 5, wherein calculating further includes processing: the total number of individuals within the store, the total number of individuals per queue, the total number of items per individual, closed checkout terminal identifiers for the closed terminals, the staff identities, and the performance metrics to calculate each of the total wait times.

9. The method of claim 8, wherein displaying further includes displaying a suggested queue identifier for a select one of the queues on the monitor for viewing by a next individual approaching the queues for checkout based on each of the total wait times and the performance metrics associated with each of the staff identities.

10. The method of claim 1 further comprising, sending a staff member message to a staff operated device of a particular staff member to open a closed checkout terminal for checkouts based on a shortest total wait time from the total wait times approaching a threshold wait time and based on the corresponding transaction performance metrics associated with the particular staff member.

11. A method, comprising:
maintaining a customer count for customers present within a store from video;
obtaining staff identifiers for staff working at the store;
obtaining transaction performance metrics associated with each staff identifier;
tracking first customers from the customers that are waiting in lanes of checkout terminals for checkouts;
calculating expected wait times for second customers that are approaching the lanes based on a total number of the first customers at each lane and the corresponding transaction performance metrics for first staff identifiers associated with first staff of the staff that is operating at least some of the checkout terminals;
displaying the expected wait times per lane on monitors when the second customers approach or are adjacent to any of the lanes;
maintaining current transaction performance metrics for the first staff members as checkouts are processed at the checkout terminals; and
updating the transaction performance metrics for the first staff members with the current transaction performance metrics.

12. The method of claim 11 further comprising, pushing a notification to a second staff member of the staff to open a closed checkout terminal based on a shortest expected wait time from the expected wait times that is approaching a threshold wait time and based on the second customers and third customers from the customers that remain in the store and that have not checked out and further based on the corresponding transaction performance metrics associated with the second staff member.

13. The method of claim 11, wherein tracking further includes identifying a total number of items per first customer from the video.

14. The method of claim 13, wherein identifying further includes providing at least one image of a cart that includes the items per first customer to a trained machine-learning algorithm and receiving as output the total number of items per first customer as output from the trained machine-learning algorithm.

15. The method of claim 11, wherein displaying further includes displaying on the monitors display information comprising: a checkout terminal identifier for each checkout terminal, the total number of first customers per checkout terminal identifier; and the expected wait time per checkout terminal identifier.

16. The method of claim 15, wherein displaying further includes sorting the display information presented on the monitors from shortest expected wait times to longest expected wait times.

17. The method of claim 16, wherein displaying further includes organizing the display information presented on the monitors into two groups of separately sorted information comprising a first group of staff-assisted checkout terminals being operated by the first staff and a second group of Self-Service Checkout (SSCO) terminals operated by select ones of the first customers performing self-checkouts.

18. A system, comprising:
cameras configured to capture images within a store;
transaction terminals configured to perform checkouts from the store;
a server that includes a processor and a non-transitory computer-readable storage medium comprising executable instructions representing a terminal load manager;

the terminal load manager when executed by the processor from the non-transitory computer-readable storage medium configured to cause the processor to perform processing comprising:
  tracking a total number of customers in a queue for the checkouts per transaction terminal from the images captured by the cameras;
  tracking a total number of items possessed by each customer from the images;
  obtaining transaction performance metrics for operators of each of the transaction terminals, wherein the transaction performance metrics represent historical transaction performance for each of the operators;
  predicting an expected wait time for entering each of the queues based on the total number of the customers per queue, the total number of items per customer, and the transaction performance metrics per operator;
  sending a notification to a second operator that instructs the second operator to open a closed transaction terminal for assisting in the checkouts based on a shortest expected wait time selected from the expected wait times approaching a threshold wait time;
  displaying on monitors adjacent to the transaction terminals the expected wait time for each of the transaction terminals;
  maintaining current transaction performance metrics for the operators as checkouts are processed at the transaction terminals; and
  updating the transaction performance metrics for the operators with the current transaction performance metrics.

19. The system of claim 18, wherein the transaction terminals comprise:
  Point-Of-Sale (POS) terminals and Self-Service Terminals (SSTs).

* * * * *